United States Patent Office 3,280,041
Patented Oct. 18, 1966

3,280,041
METHOD OF PREPARING A PLATINUM ON ALUMINA REFORMING CATALYST COMPOSITION
Malden W. Michael, Stamford, Conn., assignor to American Cyanamid Company, New York, N.Y., a corporation of Maine
No Drawing. Filed Mar. 3, 1961, Ser. No. 93,045
5 Claims. (Cl. 252—466)

The present invention relates to platinum reforming catalysts and to the process for preparing the same. More particularly, the present invention relates to platinum reforming catalysts characterized by improved activity and crush strength and to the processes for preparing the same.

It is well known in the catalytic reforming of volatile petroleum hydrocarbons in the presence of hydrogen, which reforming is frequently called hydroforming, that complex chemical reactions occur. Thus, when petroleum hydrocarbon fractions such as those boiling in the gasoline range, particularly between about 200 and 425° F., are mixed with hydrogen and passed over a platinized alumina catalyst at a temperature of about 600–1100° F. and pressure of about 50–500 p.s.i. or more, their fuel value in an internal combustion engine is materially improved. This is due to a number of reactions which take place simultaneously, including an isomerization reaction in which more highly branch chained paraffins are formed, dehydrocyclization and aromatization reactions and also a hydro cracking reaction.

Generally speaking, because of the economic advantages derived from improving the activity of such catalysts, the petroleum and catalyst manufacturing industries are continually in search of techniques or procedures whereby activity may be improved.

In addition to activity it is important that such catalysts have good crush strength. This is important if the formed particles of platinized alumina reforming catalysts are to have suitable unit life and be able to withstand repeated regenerations. As in the case of improving the activity of platinized alumina reforming catalysts, the petroleum industry and catalyst manufacturers are usually desirous of improving the crush strength of the catalyst particles whereby their ability to withstand repeated regenerations is improved, particularly when there is no adverse effect on the activity of such catalyst materials.

Accordingly, it is an object of the present invention to provide a process for preparing platinized alumina reforming catalyst characterized by improved activity and crush strength.

It is a further object of the present invention to provide platinized alumina reforming catalyst characterized by improved activity and crush strength.

It is a still further object of the present invention to provide a comparatively simple multi-step procedure employing conventional equipment by which the activity and crush strength of platinized alumina reforming catalysts are improved.

These and other objects and advantages of the present invention will become more apparent from the detailed description thereof set forth hereinbelow.

In accordance with the present invention, a process for preparing an improved platinum on alumina catalyst is provided which comprises drying an alumina which upon calcination forms gamma alumina, forming said alumina into shaped particles, calcining said particles and immersing the calcined particles in water at a temperature of from between about 35° C. and about 90° C. for a time sufficient to allow the water to percolate through the pore structure of the particles. After the immersion of the particles in water by which they are saturated, the water is separated from the particles and the particles are again calcined and subsequently impregnated with a platinum compound. Thereafter, the platinum-impregnated particles are again calcined.

By "an alumina which upon calcination forms gamma alumina" it is meant aluminas which are essentially in the trihydrate form prior to calcination, and which, upon calcination are, according to their crystal pattern, gamma alumina. Principally these aluminas are derived from "precipitated alumina" and from "Heard-type alumina sols."

By "precipitated aluminas" it is meant the aluminas formed by the addition of an acid or acid salt such as sulfuric acid, hydrochloric acid or any of the alums (aluminum sulfate containing a varying number of moles of water of hydration) to an alkali metal aluminate such as sodium or potassium aluminate. Precipitated aluminas of this type are well known to those skilled in the art.

By "Heard-type alumina sol," as that term is employed herein, it is meant alumina sols prepared by the digestion of metallic aluminum by the action of acetic or equivalent acid in the presence of mercury or other amalgamating agents. Such sols and their methods of preparation are described in U.S. Patent No. 2,258,099, Reissue Patent No. 22,196 or U.S. Patent No. 2,274,634.

Of these sources of gamma alumina, that derived from the Heard-type sol is greatly preferred in accordance with this invention in that catalysts prepared employing the same are characterized by both improved activity and crush strength, while those prepared from precipitated alumina usually result in improved activity with little if any improvement in crush strength. This will be demonstrated hereinafter.

The particular key aspect of the present invention involves the calcining of the shaped particles of alumina whereby it is converted to gamma alumina and the subsequent soaking of these particles in water at temperatures of between about 35° C. and about 90° C. It is believed that it is these particular steps in applicant's integrated process that result in or are most significant in producing the improvement in activity and in some instances crush strength of the final catalyst particles of this invention.

In general, the temperature of the soaking water should be above room temperature and preferably less than boiling if the beneficial effects of the soaking are to be obtained without producing any unnecessary rough contact between the catalyst particles which would occur at the boiling temperature. As noted above, the temperature of the water during soaking should be between about 35 and about 90° C., though preferably its temperature is from between about 50 and about 80° C.

The amount of water employed relative to the amount of formed particles is that amount which would insure thorough and complete soakage of the formed particles or that amount which would percolate completely through the pore structure of the particles. Normally this amount of water might be on a weight basis about 3 parts of water or more per part of formed particles.

The time for soaking under the above-described temperature conditions is that time which is sufficient to allow the water to percolate through the pore structure of the particles. Usually this is a time of between about ½ and about 4 hours, though more normally at times from about 1 hour to about 3 hours insures the degree of soakage or percolation deemed necessary in accordance with this invention.

At the end of the soaking period, the water is separated from the formed particles, as by filtering or other suitable separation techniques, and the soaked particles are calcined. After this second calcination the particles are impregnated with a platinum compound and, if desired, additional halogen may be incorporated to further improve the activity of the final catalyst in accordance with prior art procedures and techniques.

The platinum compound employed to impregnate the formed particles at this stage of the present process may be any of a number of suitable platinum compounds known to those skilled in the art such as, for example, chloroplatinic acid, platinum tetrachloride and their equivalents. The platinum compound, usually in the form of an aqueous solution or suspension, is employed in the impregnation of the particles so as to provide from between about 0.05 up to about 1% of platinum based on the dry weight of the final catalyst composition, although preferably the amount of platinum is from between about 0.1 and about 0.6%, based on said weight.

It should be noted that while the invention is described herein with respect to the use of platinum compounds, platinum reforming catalysts as the term is employed herein refers to catalyst, the principal active ingredient of which is platinum, palladium, rhodium, iridium, osmium and ruthenium. Platinum compounds per se are generally preferred.

As noted above, added halogen may be employed to improve the activity of the catalyst in accordance with the teachings of the prior art as, for example, those set forth in U.S. Patent No. 2,479,109. In general, the halogen employed may be either fluorine or chlorine and it may be introduced preferably as an aqueous solution of compounds containing these elements such as hydrogen chloride, aluminum chloride, hydrogen fluoride, aluminum fluoride, fluorosalicylic acid and the like. The amount of halogen employed is normally from between about 0.3 to 1.25% based on the dry weight of the final catalyst composition, though preferably as an amount from between about .1 and about .8% based on the dry weight of the final catalyst composition.

After impregnation of the soaked alumina with a platinum compound and, if desired, an added halogen-containing compound, the formed particles are once again calcined. Calcination at any of the three calcining steps in accordance with this invention may be carried out in accordance with the usual procedures of the prior art. Preferably the formed particles at these stages are initially dried or rendered dry to the touch by employing moderate temperatures as, for example, temperatures up to 300° F. and thereafter calcined at temperatures above 1000° F. and preferably above 1100° F. to temperatures of the order of 1500° F. These calcination temperatures activate the alumina or the impregnated alumina at the various stages in applicant's process.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

EXAMPLE 1

200 grams of 1/8" x 1/8" alumina pellets, which had been made by drying and pelleting alumina sol of the Heard type, were calcined for one hour at 1400° F. They were then treated for 1½ hours with water at 80° C. by immersing them in 600 cc. water. The water was kept in motion by means of a stirrer located above the pellets. At the end of the 1½ hours they were removed from the water, dried at 250° F. and calcined for one hour at 1100° F.

The dried and calcined pellets were then impregnated, using the pore saturation technique, with a solution of chloroplatinic acid containing sufficient platinum to give 0.6% platinum on the finished catalyst. The impregnated pellets were then dried at 250° F. and calcined at 1100° F. to activate the catalyst.

EXAMPLE 1-A

The pellets used in Example 1 were platinized without water leaching.

EXAMPLE 2

The same procedure as in Example 1 was followed, but this time the size of the alumina pellets was 1/16" x 3/16". These pellets were extrudates.

EXAMPLE 2-A

Extrudates of the type used in Example 2 were impregnated with platinum without prior water leaching.

EXAMPLE 3

The same procedure as in Example 1 was followed, but in this case the alumina was of the eta form produced by the ammonia ageing of Heard-type sol in accordance with procedures described in British Patent Nos. 787,755, 735,390 and U.S. Patent No. 2,959,536 and the pellet size was 1/16" x 3/16". These pellets were extrudates.

EXAMPLE 3-A

Extrudates of the type used in Example 3 were impregnated with platinum without prior water leaching.

EXAMPLE 4

The same procedure as in Example 1 was followed, but the alumina was formed from precipitated alumina, i.e. gamma alumina obtained by calcination of the reaction product of alum solution with alkali metal aluminate, and the pellets were extrudates of a size 1/16" x 3/16".

EXAMPLE 4-A

Extrudates used in Example 4 were impregnated with platinum without prior water leaching.

In order to demonstrate the improvements in activity and in some instances crush strength resulting from applicant's process, the catalysts prepared in Examples 1–4 and 1–A to 4–A hereinabove were tested both for activity and crush strength.

The activity values reported in Table I below are determined in accordance with a hydroforming or reforming test under standardized conditions employing 50 milliliters of catalyst in a quasi-isothermal reaction zone surrounded by an electrically heated block for temperature control. The test was carried out at a catalyst outlet temperature of 920° F. (493° C.), a pressure of 200 pounds per square inch gauge, an hourly weight space velocity of 2, and a once-through hydrogen rate of 5,000 standard cubic feet per barrel of feed. The feed was a mid-continent virgin naphtha having an A.S.T.M. distillation range of 210 to 356° F. (99 to 170° C.), a CFR–R octane number of 44.0, an API gravity of 55.2°, a Reid vapor pressure of 1.1 pounds per square inch, and a composition consisting of 50.0% by volume of paraffins, a trace of olefins, 41.5% naphthenes, 8.5% aromatics, 0.028% sulfur, and 0.01% nitrogen (Kjeldahl). The catalyst activity was calculated as the relative quantity expressed as a percentage of an arbitrarily chosen standard catalyst required to produce a $C_5+$ product fraction having the same octane number under the same test conditions and the same platinum and chloride content of the catalyst.

The crush strength values of the catalyst particles were determined in accordance with prior art procedures in which the pellet is laid on its side on a platform scale and pressure applied at an even rate until the pellet is crushed. The weight applied at this crushing is recorded as the crush strength and the average of 20 pellets is considered the average crush strength.

The results of these tests are set forth in Table I hereinbelow.

Table I

| Example | Activity | Crush Strength in lbs. | | Type Al₂O₃ | Source |
|---|---|---|---|---|---|
| | | Platinized Only | Water Leaching Plus Platinizing | | |
| 1 | 144 | | 23.8 | Gamma | Sol. |
| 1-A | 100 | 7.8 | | Gamma | Sol. |
| 2 | 166 | | 20.4 | Gamma | Sol. |
| 2-A | 127 | 10.7 | | Gamma | Sol. |
| 3 | 210 | | 11.7 | Eta | NH₄OH aged sol. |
| 3-A | 197 | 11.9 | | Eta | NH₄OH aged sol. |
| 4 | 197 | | 17.5 | Gamma | Ppt.[1] |
| 4-A | 174 | 12.8 | | Gamma | Ppt.[1] |

[1] Precipitated.

The catalysts of Examples 1, 2 and 4, the catalysts of this invention, demonstrate that the employment of the process of this invention on catalyst employing gamma alumina are improved substantially both with respect to activity and crush strength, while those prepared employing eta alumina are not so improved. It is, of course, also evident from Table I that unless the catalysts are water leached in accordance with this invention the improvements in activity and crush strength do not result.

While the present invention has been demonstrated primarily with respect to pellets, it should be noted that formed particles of any kind such as beads and the like are fully contemplated. Further, it should be noted that promoters such as fluorine and chlorine, or other catalytically active materials such as various metal and metal oxides, may be employed in minor amounts to further improve activity or to achieve a particular purpose or function in accordance with the teachings of the prior art.

I claim:

1. A process for preparing an improved platinum on alumina catalyst which comprises forming shaped particles of gamma alumina, calcining said particles, immersing said particles in water at a temperature of between about 35° C. and about 90° C. for a time sufficient to allow the water to percolate through the pore structure of said particles, separating said water from said particles, calcining said particles, impregnating said particles with a platinum compound and thereafter calcining said impregnated shaped particles.

2. A process according to claim 1 in which the gamma alumina is derived from a Heard-type sol.

3. A process according to claim 1 in which the gamma alumina is derived from a precipitated alumina.

4. A process for preparing an improved platinum on alumina catalyst which comprises forming an alumina sol of the Heard type into pellets, calcining said pellets, immersing said pellets in water at a temperature of between about 50° C. and about 80° C. for a time sufficient to let the water percolate through the pore structure, separating the water from the pellets, calcining said pellets, impregnating said pellets with an aqueous solution of chloroplatinic acid and thereafter calcining said impregnated pellets.

5. A process for preparing an improved platinum on alumina catalyst which comprises forming shaped particles of gamma alumina, calcining said particles, immersing said particles in water at a temperature of between about 35° C. and about 90° C. for a time sufficient to allow the water to percolate through the pore structure of said particles, said time being for from about one-half hour to about 4 hours, separating said water from said particles, calcining said particles, impregnating said particles with a platinum compound and thereafter calcining said impregnated shaped particles.

References Cited by the Examiner

UNITED STATES PATENTS

| | | | |
|---|---|---|---|
| 2,840,514 | 6/1958 | Brennan et al. | 252—466 X |
| 2,881,051 | 4/1959 | Pingard | 23—143 |
| 2,898,289 | 8/1959 | Kimberlin et al. | 252—466 X |
| 2,922,767 | 1/1960 | Koch | 252—466 |
| 3,025,247 | 3/1962 | Oleck | 252—466 |
| 3,032,512 | 5/1962 | Michael et al. | 252—466 X |
| 3,038,865 | 6/1962 | Abrahams | 252—466 |
| 3,058,907 | 10/1962 | Van Nordstrand et al. | 208—138 |
| 3,071,537 | 1/1963 | Porter et al. | 208—65 |
| 3,098,829 | 7/1963 | White et al. | 252—466 |

FOREIGN PATENTS 776,102  6/1957  Great Britain.

OSCAR R. VERTIZ, Primary Examiner.

JULIUS GREENWALD, MAURICE A. BRINDISI, N. DAVIS, G. OZAKI, Assistant Examiners.